UNITED STATES PATENT OFFICE.

D. E. SOMES, OF BIDDEFORD, MAINE, ASSIGNOR TO JAMES S. ANDERSON, OF SAME PLACE.

IMPROVEMENT IN CURING PROVISIONS.

Specification forming part of Letters Patent No. 30,658, dated November 13, 1860.

*To all whom it may concern:*

Be it known that I, D. E. SOMES, of Biddeford, in the county of York and State of Maine, have invented or discovered a new and useful Mode of Curing Meats and Flesh in Different Latitudes; and I do hereby declare that the following is a full, clear, and exact description of my discovery.

The nature of my invention consists in the use and employment of shafts, constructed and arranged in the manner hereinafter described, in which the temperature of the atmosphere is maintained at from 40° to 45° Fahrenheit at all seasons of the year in any latitude for the purpose of salting and curing meats.

It is a fact well known that the temperature of the atmosphere may be reduced very materially during the summer season or during the warmer months by sinking shafts into the earth. It is also a well-known fact that animal flesh may be salted and cured at or about the temperature of 40°, and that it cannot be cured at a temperature many degrees above this, because decomposition will ensue and prevent. In view of the fact that meats and flesh may be cured at or about this temperature and that by sinking shafts into the earth the minimum temperature of the climate may be obtained, I propose that where a sufficiently low temperature cannot be produced by simply sinking a shaft into the earth to surround this shaft with a casing or jacket which will be filled with salt and ice, or any other cooling mixture, for the purpose of still further reducing the temperature to that which is best adapted for curing meats. In the State of New York the mean annual temperature of the air is about 56°, and it is possible in this State that by sinking a shaft a proper depth a sufficiently low temperature may be obtained during the warm months to cure meats without artificial means; but in the State of Texas, where the mean annual temperature is about 67°, it will be impossible to obtain a temperature sufficiently low to cure meats without the use of artificial refrigeration about the shaft; and in order to secure my end I surround the shaft, as before stated, with a jacket or casing which is filled with salt and ice or some other cooling mixture. These shafts are made sufficiently large to be used as packing houses, the meat or flesh being lowered into them and there salted and allowed to remain until properly cured for the market.

It will be understood that in sinking a shaft I always descend low enough into the earth to obtain the minimum temperature, and that when this temperature is not low enough naturally I reduce it in the manner before described. Walls may be erected around these shafts in order to protect them from the rays of the sun and the heated earth of the surrounding vicinity. I deem it best during the time I am salting and curing meats, &c., in this way that no covering be placed over the shaft, but that they be left uncovered, so that there may be no impediment to the radiation of heat from the bottoms of the shafts.

Hides may be cured equally well in the same manner, as well as fish and other articles useful as food.

The packing and curing of meat, &c., in cellars is well known, and is therefore not claimed by me; but,

Having thus fully described my invention, what I claim as new, and desire to secure by Letters Patent, is—

Salting and curing food and hides in latitudes too warm for the ordinary processes to be carried on, by means of operating in excavations made in the earth to a depth sufficient to attain the minimum temperature and further cooled by artificial refrigeration, as set forth.

D. E. SOMES.

Witnesses:
C. M. ALEXANDER,
DANIEL R. PRATT.